D. R. HARDER.
DRESS-PROTECTORS FOR VEHICLES.
No. 187,377. Patented Feb. 13, 1877.
Fig 1.
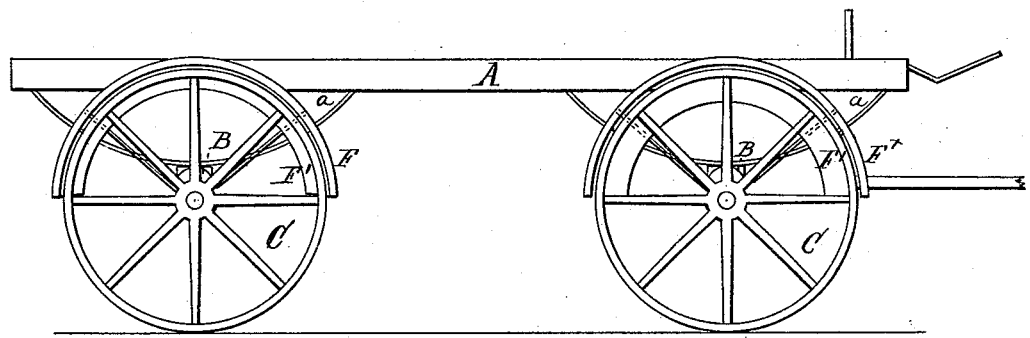
Fig 2.        Fig 3.
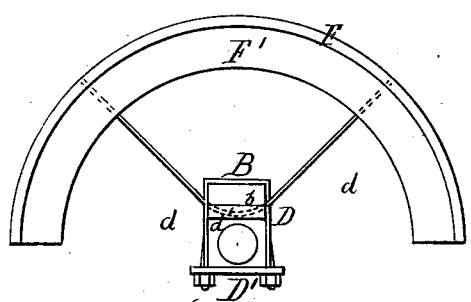 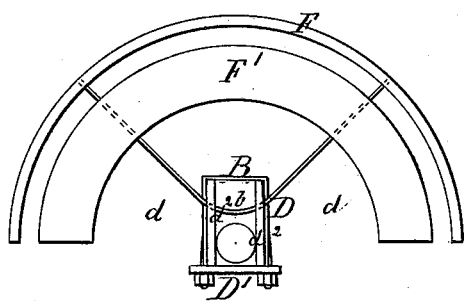
Fig 6.    Fig 4.    Fig 7.
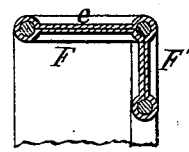 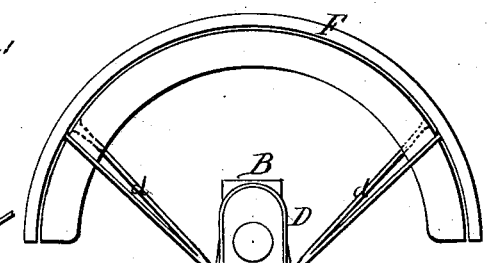 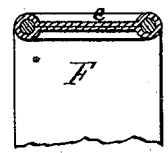
Fig 9.       Fig 8.
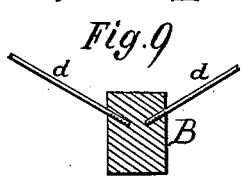
Fig 5.
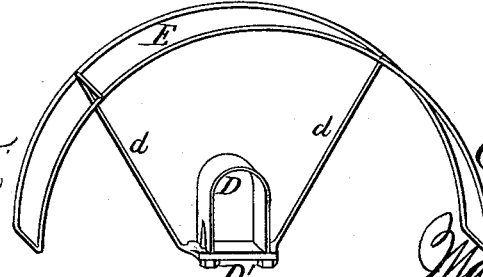
Witnesses:
James Martin Jr.
J. P. Theodore Lang
Inventor:
Dennis R. Harder
by
Mason, Fenwick & Lawrence
Attys.

UNITED STATES PATENT OFFICE.

DENNIS R. HARDER, OF NORTH CHATHAM, NEW YORK.

IMPROVEMENT IN DRESS-PROTECTORS FOR VEHICLES.

Specification forming part of Letters Patent No. 187,377, dated February 13, 1877; application filed December 14, 1876.

*To all whom it may concern:*

Be it known that I, DENNIS R. HARDER, of North Chatham, in the county of Columbia and State of New York, have invented a new and useful Improvement in Dress-Protectors for Vehicles; and I do hereby declare that the following is a full, clear, and exact description thereof, reference being had to the accompanying drawings, making part of this specification, in which—

Figure 1 is an elevation of a vehicle provided with my improved dress-protector. Fig. 2 is an elevation of the said dress-protector, showing its mode of fastening to the axle of the vehicle. Fig. 3 is a modification of Fig. 2; Fig. 4, a plan view of my improved dress-protector. Fig. 5 is a perspective view of the frame of my improved protector, its covering being removed. Fig. 6 is a vertical cross-section of Fig. 2; Fig. 7 is a vertical cross-section of Fig. 4, and Fig. 8 is a vertical cross-section of Fig. 3. Fig. 9 is a cross-section of the shaft, showing a modification of the fastening of the fender.

The nature of my invention consists in a wheel-fender, fastened upon the axle near the wheel.

The object of my invention is to have a fender as near as possible to the wheel, out of the way of the carriage or wagon body, and under all circumstances to remain in a fixed, concentric position with the periphery of the wheel.

In the drawings, A represents the body of a vehicle, having springs $a$, axles B, and wheels C. The axles B are provided with notches or grooves $b$, into which an angular or otherwise bent rod, $d$, is inserted. The so inserted part of the rod $d$ is held in its place by a horizontal strap, $d^1$, fastened to the axle. The ends of the rod $d$ are attached to and support a frame, E, which is concentric with the wheel, and is covered with leather $e$, oil-cloth, sheet-iron, wood, or any suitable material or fabric, and thereby forms a fender, F, which prevents sand or mud from being flung from the wheel upon the persons inside or near the vehicle. The said fender F may be provided with a side fender, F', either united with it, as seen in Figs. 2 and 6, or separated from it, as seen in Figs. 3 and 8. The latter construction is especially suitable for front axles, which are often swung so much to one side that the inner wheel strikes the rubbing-iron on the wagon-body. In this case the fender is bent by the wagon-body, so that the rim of the wheel enters the space between the concentric and the side fender without touching either of them, and when the wheel recedes from the wagon-body the fender will right itself again by means of the elasticity of the rod $d$. The rod $d$ may be secured in position by means of vertical straps $d^2$, fastened to the axle below and above, as seen in Fig. 3, or the rod $d$ may be separated and the ends thereof inserted with or without screw-thread into the solid axle, as the section in Fig. 9 shows.

The rod $d$ may be of any suitable shape and material; it may be round, square, oblong, or wire twisted or straight, and it may be bent to ornamental shapes, and so on. The covering of the frame E may be of any suitable material, and, if of sheet metal or wood, the frame E may be partly omitted. The wooden or sheet-metal fender may of itself be made strong enough to be directly fastened to the rod or rods $d$ without any frame E. The rods $d$ may be united to the clip-plate D', as shown in Fig. 4 of the drawings, and also to the peripherical hood F and side fender F', for the purpose of great strength and durability. D is a clip-bolt and D', a horizontal clip-plate. The said clip-bolt D, after being fitted over the axle B, has its screw-threaded portions passed through holes in the horizontal clip-plate D', and secured thereto by means of nuts, as shown.

By my improved wheel-fender not only the persons inside the vehicle, but also the sides of the vehicle, are perfectly protected, while the vehicle presents a light and unincumbered appearance.

The fender herein described is as applicable to the axles of car-wheels as to carriage or wagon wheels, and it will answer as a mud-fender as well as a dress-protector.

Having described my invention, what I claim as new, and desire to secure by Letters Patent, is—

1. A fender for vehicles, composed of the frame E, peripherical covering or hood F, and side fender F', united together or separated, the rods d, and horizontal clip-plate D', substantially as described.

2. A concentric fender, substantially as described, attached to, or united with, the clip-plate D' below the axle, or to the part b above the axle, as set forth.

Witness my hand, in the matter of my application for a patent for an improved dress-protector for vehicles, this 7th day of November, 1876.

DENNIS R. HARDER.

Witnesses:
P. T. HARDER,
JAS. VAN ALLEN, Jr.